United States Patent [19]

Holmes

[11] 4,359,760
[45] Nov. 16, 1982

[54] TELEVISION GHOST CANCELLATION SYSTEM

[75] Inventor: David D. Holmes, Chesterfield, N.J.

[73] Assignee: RCA Corporation, New York, N.Y.

[21] Appl. No.: 228,593

[22] Filed: Jan. 26, 1981

[30] Foreign Application Priority Data

Aug. 14, 1980 [GB] United Kingdom ................ 8026515

[51] Int. Cl.³ .............................................. H04N 5/21
[52] U.S. Cl. .................................... 358/167; 358/905
[58] Field of Search .......................... 358/167, 905, 36

[56] References Cited

U.S. PATENT DOCUMENTS

| 3,935,536 | 1/1976 | Kimura | 358/905 |
|---|---|---|---|
| 3,988,775 | 10/1976 | Nakagawa | 358/36 |
| 4,053,932 | 10/1977 | Yamaguti | 358/167 |
| 4,128,848 | 12/1978 | Nakagawa | 358/167 |
| 4,152,657 | 5/1979 | Robers | 358/905 |
| 4,275,420 | 6/1981 | Yamada | 358/167 |

*Primary Examiner*—Michael A. Masinick
*Attorney, Agent, or Firm*—E. M. Whitacre; P. J. Rasmussen; W. B. Yorks

[57] ABSTRACT

A television ghost cancellation system is provided which includes a delay line having an input coupled to receive video signals which include a training signal component. The delay line provides a delay to the video signals which is substantially equal to the delay of the ghost of the training signal with respect to the training signal when a ghost signal is present. This delay causes a delayed training signal to appear at the output of the delay line at the same time that its ghost is applied to the input of the delay line. The delayed signal at the output of the delay line is applied to a control amplifier, which is coupled in a feedback loop with an amplitude comparator and a sample-and-hold circuit. The amplitude comparator compares the delayed training signal with the ghost at the input of the delay line and produces an error signal indicative of the amplitude differences between the two signals. The error signal is stored by the sample-and-hold circuit and is used to develop a control signal for the control amplifier so that the control amplifier will produce a pseudo-ghost signal which is of equal amplitude and opposite polarity as the training signal ghost during the sampling interval. The pseudo-ghost signal is combined with the original video signal to produce a deghosted output signal.

3 Claims, 4 Drawing Figures

TELEVISION GHOST CANCELLATION SYSTEM

This invention relates to television ghost cancellation systems and, in particular, to a system which develops a pseudo-ghost signal for combination with a television signal to cancel a ghost signal of the television signal.

Concurrently filed United States patent application Ser. No. 228,595, now allowed entitled "TELEVISION SIGNAL GHOST DETECTOR", describes a ghost signal detector system which determines the existence and time location of a ghost signal component with respect to its corresponding main signal component. Once a ghost signal component has been detected, this system will continue to track the ghost from one television field to another. The ghost detector provides two types of indication signals. The first is a mode signal which indicates whether a ghost has been located. When no ghost signal has been detected, this first signal indicates a "search" mode. When a ghost signal has been found, the first signal changes to indicate that the detector is in its "APC" mode, during which the ghost signal will be tracked.

The second type of signal provided by the ghost detector is one which provides information as to the time location of the detected ghost signal component. In the embodiments shown in the aforementioned patent application, this signal is an oscillatory signal developed by a voltage controlled oscillator. The frequency of the oscillatory signal is the required frequency to drive a known clocked delay line so that the main signal will appear at the output of the delay line at the same time that its ghost signal component appears at its input. The oscillatory signal is thus an accurate measure of the delay of the ghost signal component with respect to the corresponding main signal component when the first indication signal is in the APC mode.

It is desired to provide a ghost cancellation system which utilizes the information of the mode and oscillatory indication signals of the aforementioned ghost signal detector system to cancel the ghost signal. In accordance with the principles of the present invention, such a system is provided which includes a clocked delay line which, in the preferred embodiment, is comprised of a like number of stages as the clocked delay line in the ghost detector. This delay line may be driven by the oscillatory signal of the ghost detector. When a ghost signal has been detected, the delay line imparts a delay to an applied video signal so that the main signal appears at the output of the delay line at the same time that the ghost signal is applied to its input. The delayed main signal at the output of the delay line is applied to a control amplifier, which is coupled in a feedback loop with an amplitude comparator and a sample-and-hold circuit. The amplitude comparator compares the delayed main signal with the ghost signal at the input of the delay line when these two signals are coincident in time at its inputs. The amplitude comparator produces an error signal indicative of the amplitude and polarity differences between the two signals. The error signal is stored by the sample-and-hold circuit and used to control the transfer characteristic of the control amplifier. Over a number of sampling intervals, the error signal will approach a steady state value for a given ghost signal. The control amplifier will thereby produce an accurate pseudo-ghost signal. The pseudo-ghost signal is of the same amplitude but opposite polarity as the ghost signal and is in time coincidence with the ghost signal. The pseudo-ghost signal is combined with the main signal to remove the ghost signal from the main television signal.

Figure 1:
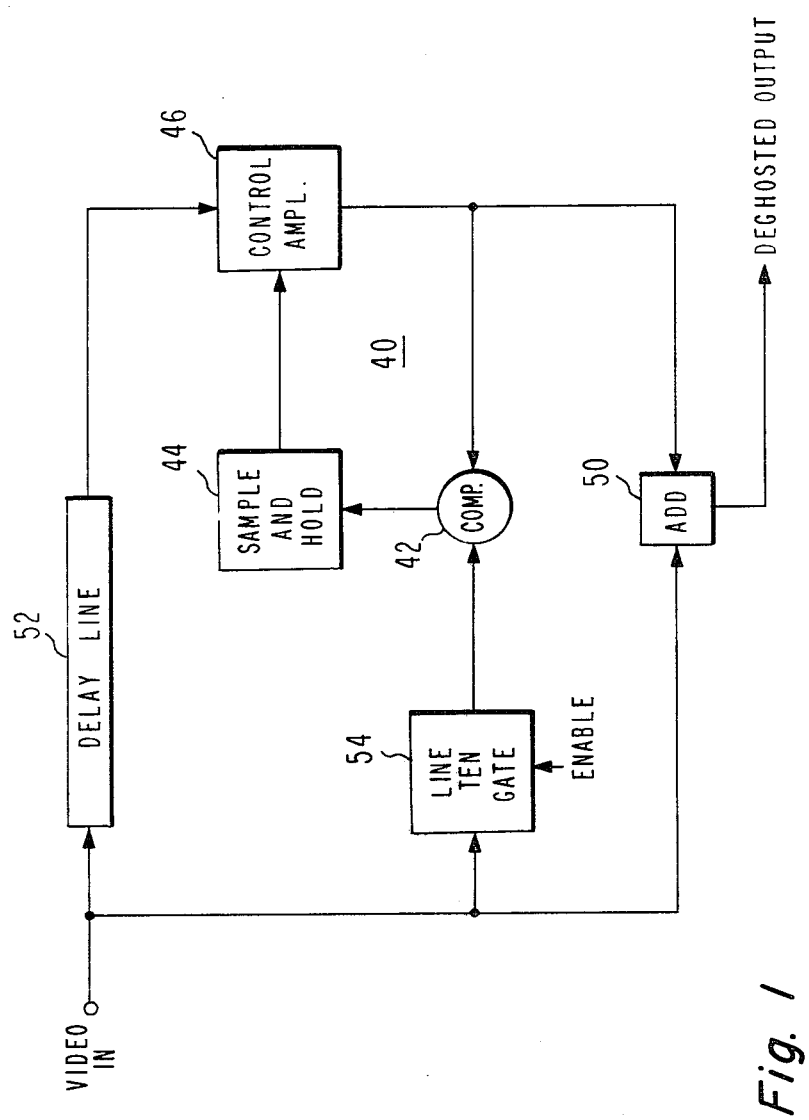
FIG. 1 illustrates in block diagram form of television ghost cancellation system constructed in accordance with the principles of the present invention.

Referring to FIG. 1, a ghost cancellation system is shown. A video signal is applied to the inputs of a delay line 52, a line ten gate 54, and a combining circuit 50. The delay line 52 provides a delay to the video signal which is substantially equal to the delay of a ghost signal component of the video signal with respect to the main video signal. With this delay, a main signal component will appear at the output of the delay line at the moment that its corresponding ghost signal component is applied to the inputs of the delay line 52, the line ten gate 54, and the combining circuit 50.

The delayed signal at the output of the delay line is applied to the input of a control amplifier 46. The delayed signal is passed by the control amplifier and applied to inputs of an amplitude comparator 42 and the combining circuit 50. The combining circuit has an output at which a deghosted video signal is produced.

The line ten gate 54 is closed only when it is enabled during line ten of the video field. Its output is coupled to a second input of the amplitude comparator 42. The output of the amplitude comparator 42 is coupled to the input of a sample-and-hold circuit 44, the output of which is coupled to a control input of the control amplifier 46. The control amplifier 46, the amplitude comparator 42, and the sample-and-hold circuit 44 are coupled to form a feedback loop 40, which may be used to modify the pseudo-ghost signal during the time that the line ten gate passes a video signal.

The ghost cancellation system of this embodiment uses a training signal, the line ten sync signal of the television signal, to develop a control signal for the control amplifier 46. When the delay of the delay line 52 is correct, a delayed line ten sync signal will be passed by the control amplifier and applied to one input of the amplitude comparator 42 at the same time that the ghost of the line ten sync signal is applied to the other input. The amplitude comparator 42 produces an error signal indicative of the relative polarities and amplitudes of the two signals. The error signal is sampled and held by the sample-and-hold circuit 44, which develops a control signal for the control amplifier 46.

Satisfactory ghost cancellation will occur when the delayed line ten sync signal at the input of comparator 42 is of an equal amplitude and opposite polarity as the ghost signal. Therefore, if the amplitude comparator finds that the two signals are of the same polarity, the control signal for the control amplifier will cause the control amplifier to invert the delayed signal. If the delayed sync signal is larger than the ghost signal, the control amplifier will attenuate the delayed signal; if the delayed sync signal is smaller than the ghost signal, the control amplifier will amplify the delayed signal. Thus, the control amplifier will invert, amplify, or attenuate the delayed video signal as required to produce the desired pseudo-ghost signal.

Depending upon the time constants of the feedback loop 40, several line ten intervals of several television fields may be required for sampling by the loop before the error signal and the control signal stabilize at the desired values. When the control signal has stablized, the delayed signal that is combined with the undelayed signal by the combining circuit 50 will accurately cancel the ghost signal in the undelayed television signal.

During the remaining lines of a television field, the line ten gate is open, and provides no information to the amplitude comparator 42. An error signal will therefore not be produced at this time, and the control signal applied to the control amplifier will not vary between the line ten intervals. The control amplifier will continue to amplify or attenuate, and invert or non-invert the video information at this time. The control amplifier will therefore continuously supply a pseudo-ghost signal to the combining circuit 50 to cancel the visible ghost in the television picture.

Figure 2:
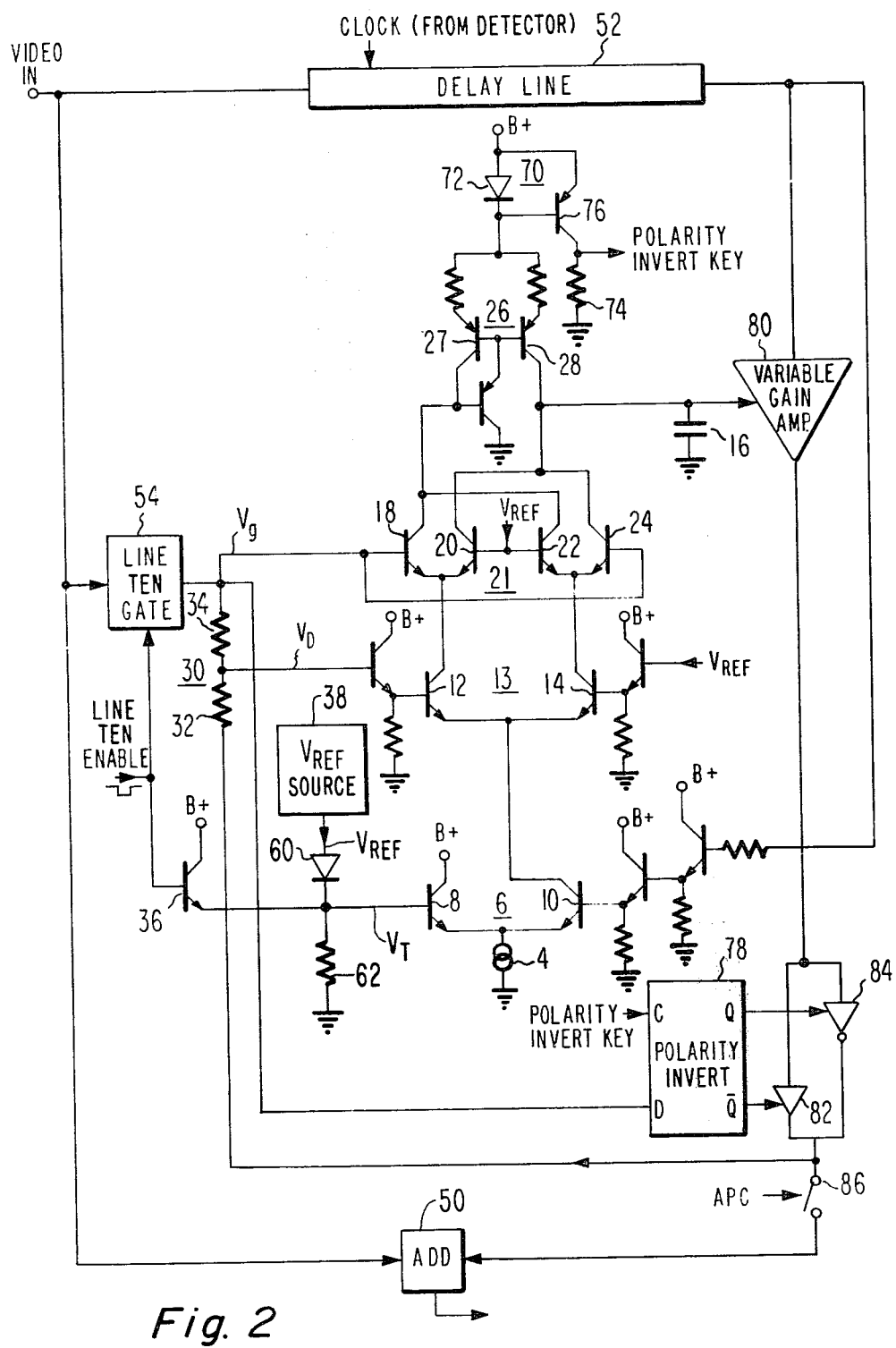
FIG. 2 illustrates, partially in block diagram form and partially in schematic diagram form, a detailed embodiment of a ghost cancellation system of the present invention.

A more detailed embodiment of a ghost cancellation system constructed in accordance with the principles of the present invention is shown in FIG. 2. Elements of FIG. 2 which are shown in FIG. 1 bear the same reference numerals, and their description will be omitted. The output of the delay line 52 is coupled to the input of a variable gain amplifier 80, the output of which is coupled to the inputs of an inverting amplifier 84 and a non-inverting amplifier 82. The outputs of the amplifiers 82 and 84 are coupled to the combining circuit 50 by a switch 86, and are also coupled to a resistor 32 of a voltage divider 30. The switch 86 is controlled by the APC signal provided by the ghost detector. The output of the delay line 52 is also coupled to the base of a transistor 10 of a differential amplifier 6 by way of two emitter follower coupled transistors.

The line ten gate 54 is enabled during video line ten by a line ten enable signal. The line ten enable signal is also applied to the base of an emitter follower coupled transistor 36. The emitter of transistor 36 is coupled to the base of a transistor 8 of the differential amplifier 6. A reference voltage $V_T$ is developed by a reference voltage source 38, which applies a reference voltage $V_{ref}$ across a voltage divider, including a diode 60 and a resistor 62. The reference voltage $V_T$ is applied to the base of transistor 8. The emitters of transistors 8 and 10 are coupled to each other and to a point of reference potential (ground) by a current source 4. The collector of transistor 8 is coupled to a source of supply voltage (B+), and the collector of transistor 10 is coupled to the joined emitters of transistors 12 and 14 of a differential amplifier 13.

The output of the line ten gate 54 is coupled to a resistor 34 of the voltage divider 30. The junction of resistors 32 and 34 is coupled to the base of transistor 12 by an emitter follower coupled transistor. The reference voltage $V_{ref}$ is applied to the base of transistor 14 by way of another emitter follower coupled transistor. The collector of transistor 12 is coupled to the joined emitters of differentially coupled transistors 18 and 20. The collector of transistor 14 is coupled to the joined emitters of differentially coupled transistors 22 and 24.

Transistors 18, 20, 22 and 24 comprise a current steering circuit 21 for the collector currents of transistors 12 and 14. The bases of transistors 18 and 24 are coupled to the output of the line ten gate 54. The bases of transistors 20 and 22 are coupled to receive the reference voltage $V_{ref}$. The collectors of transistors 18 and 22 are coupled to each other and to a current mirror 26. The collector currents of transistors 18 and 22 are replicated by the collector current of current mirror transistor 28. The collectors of transistors 20 and 24 are connected to each other, to the collector of transistor 28, and to the control input of variable gain amplifier 80. A filter capacitor 16 is coupled between the control input of variable gain amplifier 80 and ground.

The emitters of current mirror transistors 27 and 28 are coupled together through respective emitter resistors and to the cathode of a diode 72 and the base of a transistor 76. The anode of diode 72 is coupled to the emitter of transistor 76 and to the B+ supply to form a current mirror 70. The collector of transistor 76 is coupled to ground by a resistor 74. When the current mirror 70 is conducting current, an output signal labeled Polarity Invert Key is developed across resistor 74. This signal is applied to the clock input C of a "D" type flip-flop 78, referred to as the Polarity Invert flip-flop. The data input D of the flip-flop 78 is coupled to the output of the line ten gate 54. The Q output of the polarity invert flip-flop is coupled to apply an enabling signal to inverting amplifier 84, and the $\overline{Q}$ output of the flip-flop supplies an enabling signal to the non-inverting amplifier 82.

The ghost cancellation system of FIG. 2 may be advantageously operated in conjunction with the ghost detector system of the aforementioned United States patent application number (RCA 74,784), entitled "TELEVISION SIGNAL GHOST DETECTOR". When the two systems are operated together, the ghost detector system will provide the clock signal for the delay line 52 and an APC control signal for switch 86. When the ghost detector is searching for a ghost signal, the APC signal maintains switch 86 in the open position to prevent any application of spurious signals to the combining circuit 50. When a ghost signal has been located, the APC signal closes switch 86.

Figure 3:
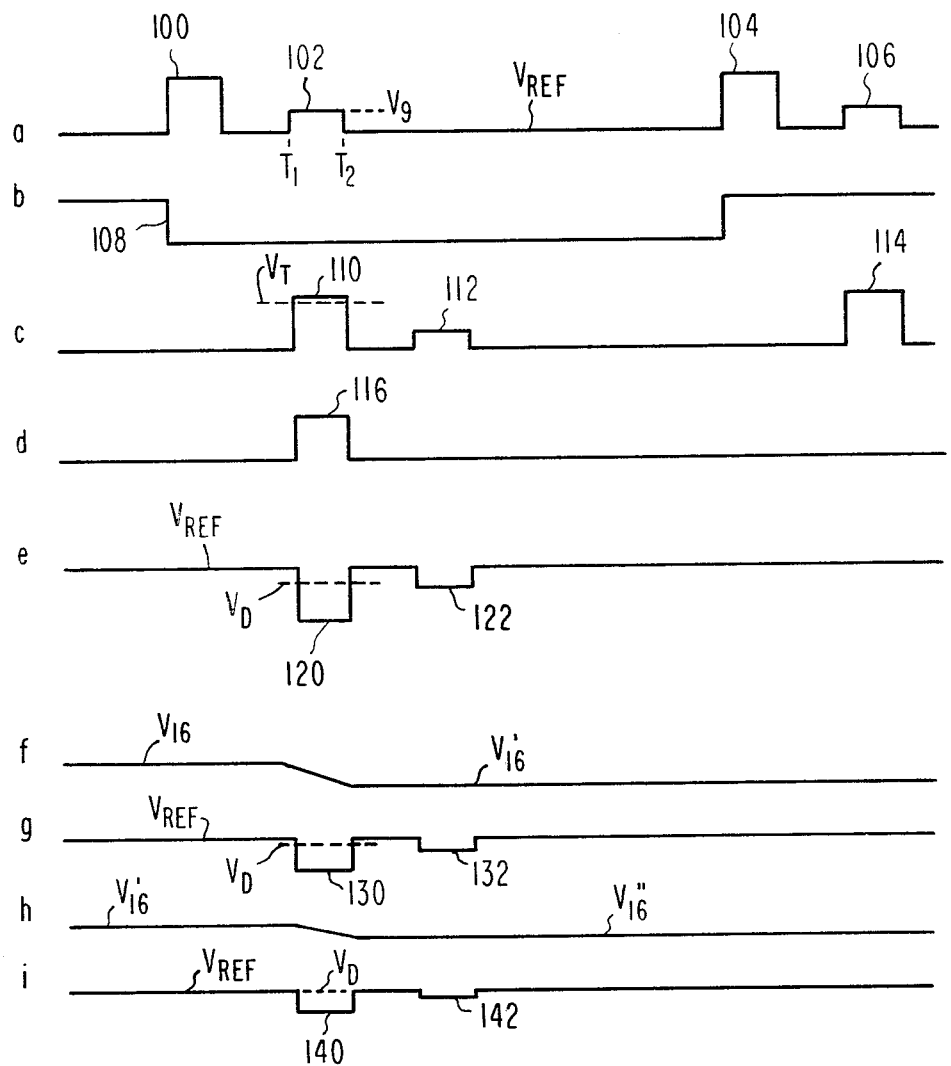
FIGS. 3 and 4 illustrate waveforms useful for explaining the operation of the system of FIG. 2.

When the detector detects a ghost, the delay line 52 will be clocked at a rate which establishes a delay such that the main signal will appear at the output of the delay line at the same time as its ghost is applied to the input of the delay line. Typical waveforms for this condition are shown in FIG. 3. FIG. 3a shows a line ten sync pulse 100 followed by a ghost signal 102. Line eleven of the video signal likewise contains a sync pulse 104 followed by its ghost signal 106. FIG. 3c illustrates the output signals of the delay line 52 when the input signal of FIG. 3a is applied to the delay line. With the delay properly established, the delay line ten sync pulse 110 will be in time coincidence with the ghost signal 102. The output of the delay line also contains a delayed ghost signal 112, and a delayed line eleven sync pulse 114.

During line ten, the line ten enable signal 108 of FIG. 3 b is applied to the line ten gate 54 to close the gate, and to the base of transistor 36. Transistor 36 is turned off by the line ten enable signal, and the reference voltage $V_T$ is applied to the differential amplifier transistor 8 by way of voltage divider 60, 62. The delayed line ten sync pulse 110 is applied to the base of transistor 10 by way of two emitter follower coupled transistors. The emitter follower coupled transistors couple the delayed video signal to the base of transistor 10 at a level such that the amplitude of the delayed sync pulse 110 exceeds voltage level $V_T$, and ghost pulses in the line ten interval are below voltage level $V_T$. Since the delayed line ten sync pulse at the base of transistor 10 exceeds the reference level $V_T$, transistor 10 will be rendered conductive to conduct current between the B+ supply at the top of the current mirror 20 and the current source 4.

When transistor 10 begins to conduct current through the stacked differential amplifiers and current mirrors of FIG. 2, the current conducted by diode 72 will be replicated by transistor 76, thereby developing a Polarity Invert Key signal across resistor 74, illustratively shown as pulse 116 in FIG. 3d. The Polarity Invert Key signal will clock the Polarity Invert flip-flop 78, which will set or reset the flip-flop in accordance with the polarity of the ghost signal 102. In the example of FIG. 3, the ghost pulse 102 is positive with respect to the reference level $V_{ref}$ in FIG. 3a. The Polarity Invert flip-flop will therefore be set, with its Q output high and its $\overline{Q}$ output low. These output signals will enable inverting amplifier 84 and disable non-inverting amplifier 82, respectively. The signal at the joined outputs of amplifiers 82 and 82 will thus be inverted with respect to the output signal of the delay line, as shown in FIG. 3e. This inverted signal is applied to resistor 32 of the voltage divider 30.

During the ghost signal interval T1-T2 of FIG. 3a, the line ten gate 54 will pass the ghost signal 102 to the output of the gate. The ghost 102 is applied to resistor 34 of the voltage divider 30. With the values of the voltage divider resistors being equal, the voltage at the center of the voltage divider 30 will be at a median level between the level of inverted and delayed sync pulse 120, and the level of the ghost signal 102. In the example shown in FIG. 3, this level will be below $V_{ref}$, as shown by dashed line $V_D$ of FIG. 3e. Since $V_D$ is below $V_{ref}$, transistor 12 will be rendered less conductive than transistor 14 of differential amplifier 14. The collector current of transistor 14 will therefore exceed that of transistor 12.

The ghost pulse 102 of FIG. 3a is also applied to the current steering circuit 21. Since the level $V_g$ of the ghost pulse 102 is above the reference level $V_{ref}$, transistors 18 and 24 will be rendered more conductive than transistors 20 and 22. The collector current of transistor 14 will therefore be conducted primarily by transistor 24. The lesser current of transistor 12 will be conducted primarily by transistor 18 and replicated as the collector current of transistor 28. Since the current conducted by transistor 24 is greater than the current supplied by transistor 28, the filter capacitor 16 will be discharged from a level $V_{16}$ to a lower level $V_{16'}$, as shown in FIG. 3f. The decreased control signal stored across the filter capacitor 16 will cause the variable gain amplifier to attenuate the delayed signals that it passes.

At the end of interval T1-T2, delayed sync pulse 110 at the base of transistor 10 will drop below the reference level $V_T$. Differential amplifier 6 will switch, so that transistor 10 is turned off. The operation of the cascaded differential amplifier and the current mirrors will cease, and the voltage level $V_{16}$ will be stored by the filter capacitor 16. As mentioned previously, the delayed ghost pulses in the remainder of the line interval are of insufficient amplitude with respect to $V_T$ to render transistor 10 conductive. At the end of the line ten interval, the enable signal 108 of FIG. 3b will go high, rendering transistor 36 conductive. This will apply a positive signal to the base of transistor 8, maintaining transistor 8 conductive and transistor 10 nonconductive until the next line ten interval.

During the next line ten interval (i.e., one field later), the inverting amplifier 84 will apply an inverted and delayed waveform to the voltage divider 30, as shown in FIG. 3g. The amplitude of the delayed sync pulse 130 is seen to be less than the amplitude of the provision line ten sync pulse 120 due to the attenuation of the signal by the variable gain amplifier 80. The delayed sync pulse 130 is again compared with the amplitude of the ghost signal by the voltage divider 30, and a voltage level $V_D$, shown in FIG. 3g, is applied to transistor 12. Since there is now a smaller disparity between levels $V_{ref}$ and $V_D$ than existed during the previous line ten, the collector current of transistor 14 will exceed the collector current of transistor 12 by a lesser magnitude than before. The collector currents will again be directed by the current steering circuit 21 and the current mirror 26, resulting in a slight discharge of filter capacitor 16 from its previous level $V_{16'}$ to a new level $V_{16''}$, as shown in FIG. 3h. The attenuation provided by variable gain amplifier 80 will accordingly be increased.

During the next line ten interval (i.e., the third field), the waveforem shown in FIG. 3i will be applied to voltage divider 30. In this example, it is assumed that the time constants of the system are such that control signal level $V_{16''}$ results in the desired attenuation of the delayed signal. The waveform at the output of inverting amplifier 84 is the proper pseudo-ghost signal, because the amplitude of delayed sync pulse 140 is equal in magnitude but opposite in polarity to the ghost signal 102. The voltage divider level $V_D$ is equal to reference level $V_{ref}$, causing transistors 12 and 14 to conduct equal collector currents. The collector current of transistor 28 will equal the collector current of transistor 24, and there will be no net charging or discharging of filter capacitor 16, which will continue to be charged to the $V_{16''}$ level. The pseudo-ghost signal of FIG. 3i is passed by switch 86. Pulse 140 will be combined with ghost signal 102 of the main, undelayed video signal by the combining circuit 50, thereby eliminating the ghost signal 102 from the main signal.

Between line ten intervals, the video signal contains picture information during the scanning intervals. This information is continuously applied to the delay line 52, attenuated by the variable gain amplifier 80, and inverted by inverting amplifier 84 to develop a pseudo-ghost signal. The psudo-ghost signal is combined with the undelayed signal by the combining circuit 50 to remove the ghost image from the television picture.

Figure 4:
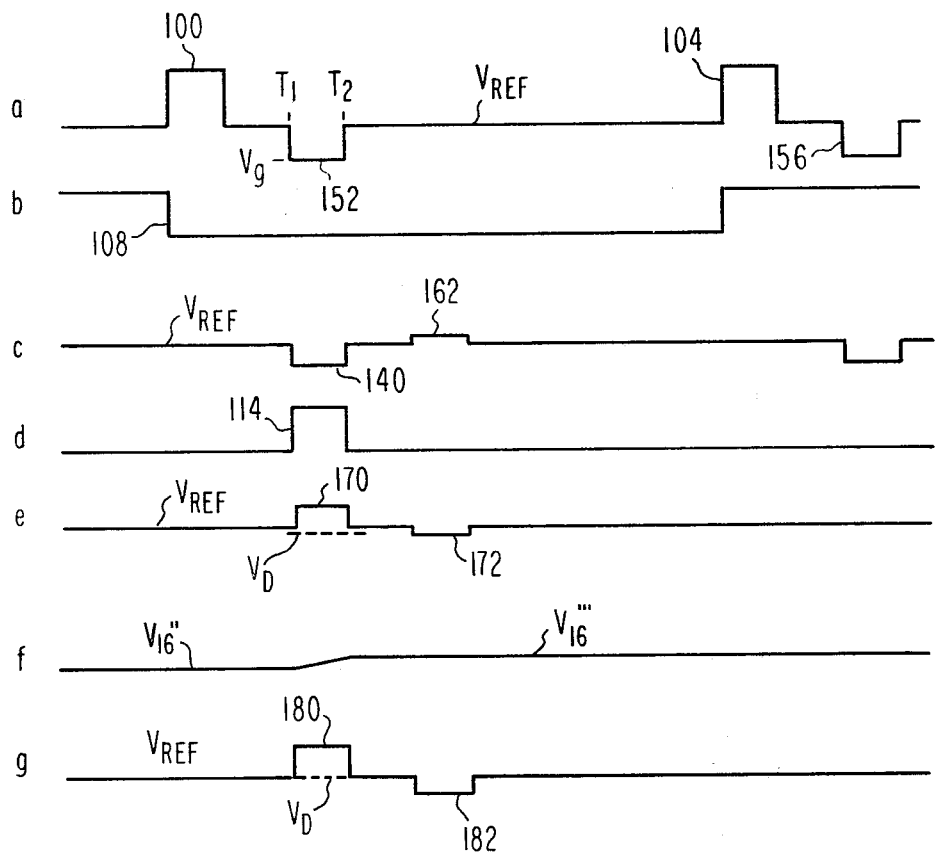

It will now be assumed that the ghost signal 102 of FIG. 3a changes in amplitude and in polarity to produce a new ghost signal 152, as shown in FIG. 4a. For purposes of illustration, it will be assumed that the delay of the new ghost signal 152 with respect to the main signal 100 is the same as that of the previous ghost signal 102, so that the delay of the delay line 52 is correct for both the previous and the new ghost signals.

The line ten signal of FIG. 4a, which contains the new ghost signal 152, is delayed by the delay line, attenuated by the variable gain amplifier 80, and inverted by the inverting amplifier 84 to produce an output signal as illustrated in FIG. 4c. It may be seen that delayed, attenuated and inverted sync pulse 140 is of incorrect amplitude and polarity to cancel the coincident ghost signal 152 in the combining circuit. The delayed sync pulse will again cause transistor 10 to be rendered conductive, and current will flow through current mirror 70 to produce a Polarity Invert Key signal 114, as shown in FIG. 4d. The Polarity Invert Key signal 114 will clock the Polarity Invert flip-flop 78 to the state of the ghost signal at the D input. Since the ghost signal 152 is negative with respect to level $V_{ref}$, the flip-flop will be clocked to a reset condition. The Q output signal will go low and the $\overline{Q}$ output will go high, thereby disabling inverting amplifier 84 and enabling the non-inverting amplifier 82. The signal applied to resistor 32 of the voltage divider 30 is now uninverted, as illustrated by the waveform of FIG. 4e. The voltage divider compares the level $V_g$ of the ghost signal 152 with the level of delayed sync pulse 152, producing a level $V_D$ at the junction of resistors 32 and 34, as shown in FIG. 4e. Since the level of $V_D$ is less than level $V_{ref}$, the collector current of transistor 14 will be greater than the collector current of transistor 12.

The ghost signal 152 is also applied to current steering transistors 18 and 24. Since the ghost signal level $V_g$ is less than $V_{ref}$, transistors 20 and 22 will be turned on, and transistors 18 and 24 will be turned off. The relatively larger collector current of transistor 14 will now be directed to the current mirror 26 by transistor 22, to be replicated as the collector current of transistor 28. The relatively smaller collector current transistor 12 will be conducted by transistor 20. The net result of the relatively larger current of transistor 28 and the relatively smaller current of transistor 20 is a charging current for the filter capacitor 16. The filter capacitor 16 will be charged from its previous level of $V_{16''}$ to a new level of $V_{16'''}$, as shown in FIG. 4f. This higher control signal level will decrease the attenuation provided by the variable gain amplifier 80.

In this example, control signal level $V_{16'''}$ is sufficient to provide the desired pseudo-ghost signal. During the next line ten interval, the video signal will be delayed, attenuated and passed by non-inverting amplifier 82 to provide the pseudo-ghost waveform shown in FIG. 4g. The difference between the ghost signal amplitude $V_g$ and the amplitude of delayed sync pulse 180 is $V_D$, which is equal to level $V_{ref}$. The system will not alter the voltage level $V_{16'''}$ of the filter capacitor 16 because differential amplifier 13 is balanced. It may be seen that the pseudo-ghost signal 180 is of the proper amplitude and polarity to cancel the ghost signal 152 of the undelayed video signal. Ghost cancellation will proceed continuously, as described above, during the scanning interval of the video signal.

What is claimed is:

1. In a television receiver, including a source of video signals which may be contaminated with a ghost signal, said video signals including a component subject to use as a training signal, a television ghost cancellation system comprising:
    means responsive to said video signal and having an output for passing a portion of said video signals which includes a ghost of said training signal when a ghost signal is present;
    a delay line, having an inut coupled to receive said video signals, and an output at which delayed video signals are produced, and exhibiting a delay which is substantially equal to the delay of the ghost signal of said training signal with respect to said training signal when a ghost signal is present;
    means having an input coupled to the output of said delay line, and an output at which modified delayed video signals including said training signal are produced, and responsive to a control signal for controllably modifying the amplitude and or the polarity of said delayed video signals to produce said modified delayed video signals to produce said modified delayed video signals;
    an amplitude comparator having a first input coupled to the output of said video signal portion passing means and a second input coupled to the output of said delayed video signal modifying means, and having an output at which an error signal is produced which is representative of the amplitude and polarity difference between said ghost signal of said training signal and said modified delayed training signal;
    a sample-and-hold circuit having an input coupled to the output of said amplitude comparator and an output coupled to said modifying means, for sampling said error signal to develop a control signal for said modifying means so as to produce a modified delayed training signal which is substantially equal to amplitude and opposite in polarity to said ghost signal of said training signal; and
    a combining circuit having a first input coupled to said video signal source and a second input coupled to the output of said modifying means for combining said video signals with said modified delayed video signals to produce deghosted video signals.

2. In a television receiver, including a source of video signals which may be contaminated with a ghost signal, said video signal including a component subject to use as a training signal, a television ghost cancellation system comprising:
    a delay line, having an input coupled to receive said video signals, and an output at which delayed video signals are produced, said delay line exhibiting a delay which is substantially equal to the delay between the occurrence of said training signal and its ghost when a ghost signal is present;
    means responsive to said video signals and having an output for passing said ghost of said training signal when a ghost signal is present;
    a loop circuit for developing a pseudo-ghost signal when a ghost signal is present, including
    an amplitude and polarity control circuit having a signal input coupled to the output of said delay line, an output at which a pseudo-ghost signal is produced, and a control input responsive to a control signal for controlling the amplitude and polarity of said pseudo-ghost signal;
    an amplitude comparator having a first input coupled to the output of said amplitude and polarity control circuit, a second input coupled to the output of said training signal ghost passing means, and an output for producing an error signal indicative of the amplitude difference between said training signal ghost and said pseudo-ghost signal;
    a sample-and-hold circuit having an input coupled to the output of said amplitude comparator and an output coupled to the control input of said amplitude and polarity control circuit for sampling said error signal and producing a control signal for said amplitude and polarity control circuit which tends to cause said pseudo-ghost signal to be substantially equal in amplitude and opposite in polarity to said training signal ghost at the time that said training signal ghost is applied to said second input of said amplitude comparator; and
    means responsive to said video signals and couled to the output of said amplitude and polarity control circuit for combining said pseudo-ghost signal with said video signals when a ghost signal is present.

3. The television ghost cancellation system of claim 1 or 2, further comprising a ghost detector for providing a clock signal representative of the delay of said ghost of said training signal with respect to said training signal, and wherein said delay line comprises a charge-coupled device delay line having a control input responsive to said clock signal provided by said ghost detector.

* * * * *